US011008179B2

(12) United States Patent
Craig et al.

(10) Patent No.: US 11,008,179 B2
(45) Date of Patent: May 18, 2021

(54) CONVEYING SYSTEM WITH HIGH SPEED LANE DIVIDER

(71) Applicant: Shuttleworth LLC, Huntington, IN (US)

(72) Inventors: Rhett E. Craig, Ossian, IN (US); Adam D. Voght, Craigville, IN (US)

(73) Assignee: SHUTTLEWORTH LLC, Huntington, IN (US)

( * ) Notice: Subject to any disclaimer, the term of this patent is extended or adjusted under 35 U.S.C. 154(b) by 0 days.

(21) Appl. No.: 16/589,565

(22) Filed: Oct. 1, 2019

(65) Prior Publication Data
US 2020/0115168 A1    Apr. 16, 2020

Related U.S. Application Data

(60) Provisional application No. 62/744,329, filed on Oct. 11, 2018.

(51) Int. Cl.
B65G 47/28        (2006.01)
B65G 47/71        (2006.01)

(52) U.S. Cl.
CPC ............. B65G 47/28 (2013.01); B65G 47/71 (2013.01)

(58) Field of Classification Search
CPC ....... B65G 47/71; B65G 47/648; B65G 47/28
See application file for complete search history.

(56) References Cited

U.S. PATENT DOCUMENTS

| 461,924 | A | | 10/1891 | Cummings | |
|---|---|---|---|---|---|
| 1,733,409 | A | | 10/1929 | Howe | |
| 1,822,111 | A | | 9/1931 | Richardson | |
| 1,871,902 | A | | 8/1932 | Mojonnier | |
| 1,930,318 | A | | 10/1933 | Mojonnier | |
| 2,038,652 | A | | 4/1936 | Froehlich | |
| 2,451,104 | A | | 10/1948 | Lowe | |
| 2,558,774 | A | | 7/1951 | Nordquist | |
| 2,701,638 | A | | 2/1955 | Petro | |
| 2,966,251 | A | * | 12/1960 | Nussbaum | B65G 47/71 198/349 |
| 3,326,349 | A | | 6/1967 | Pettis | |
| 3,729,895 | A | * | 5/1973 | Kramer | B65B 57/20 53/501 |
| 3,749,225 | A | | 7/1973 | Kennedy | |
| 4,321,994 | A | | 3/1982 | Heuft | |
| 4,443,995 | A | | 4/1984 | Myers | |
| 4,462,516 | A | | 7/1984 | Guerzoni | |
| 4,566,582 | A | | 1/1986 | Linder | |
| 5,174,430 | A | * | 12/1992 | Ebira | B65G 47/648 198/418.5 |
| 5,186,306 | A | | 2/1993 | Sjostrand | |

(Continued)

Primary Examiner — William R Harp
(74) Attorney, Agent, or Firm — Thompson Hine LLP

(57) ABSTRACT

A conveying system includes a conveyor and a diverter, the diverter including a shifting section above the conveyor. The shifting section is laterally movable across a width of the conveyor for selectively shifting objects across the width of the conveyor as the objects move along the conveyor. A drive system for effecting lateral movement of the shifting section may include at least one prime mover located beneath the conveyor. The shifting section may include spaced apart walls, each of which is a telescoping wall. A drive system for controlling telescoping of the walls may include at least one prime mover located beneath the conveyor.

18 Claims, 17 Drawing Sheets

(56) References Cited

U.S. PATENT DOCUMENTS

| | | | |
|---|---|---|---|
| 5,988,356 A | 11/1999 | Bonnet | |
| 7,591,363 B2 | 9/2009 | Wild | |
| 7,658,274 B2 * | 2/2010 | Mignano | B65G 47/71 198/353 |
| 7,845,486 B2 * | 12/2010 | Spencer | B65G 47/71 198/427 |
| 8,376,121 B2 | 2/2013 | Weidman | |
| 8,807,319 B2 * | 8/2014 | Borghi | B65G 47/642 198/367 |
| 8,939,273 B2 * | 1/2015 | Thompson | B65G 47/46 198/367.1 |
| 2005/0247542 A1 | 11/2005 | Salvoni | |
| 2007/0084698 A1 | 4/2007 | Aubry | |
| 2008/0023305 A1 | 1/2008 | Wild | |

* cited by examiner

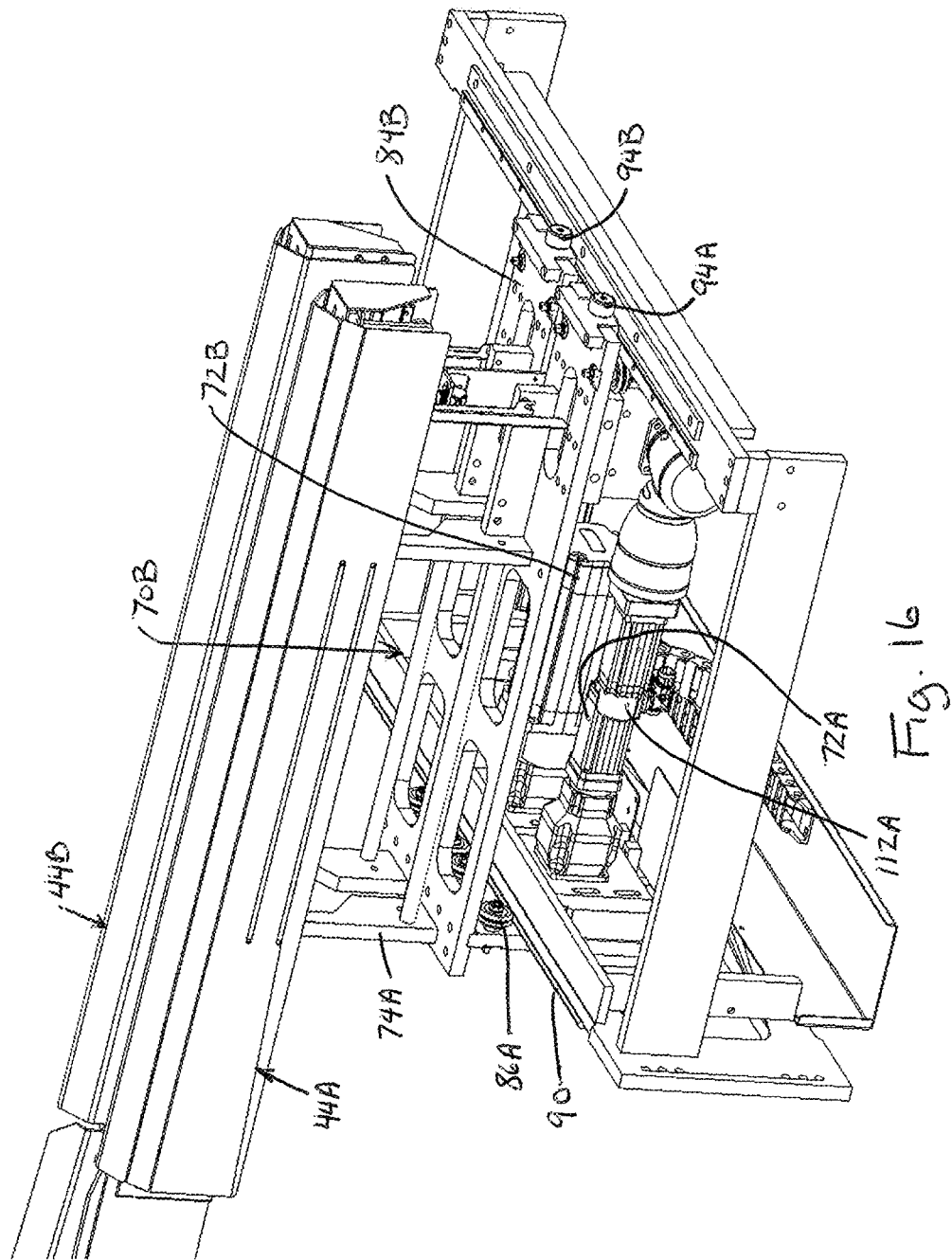

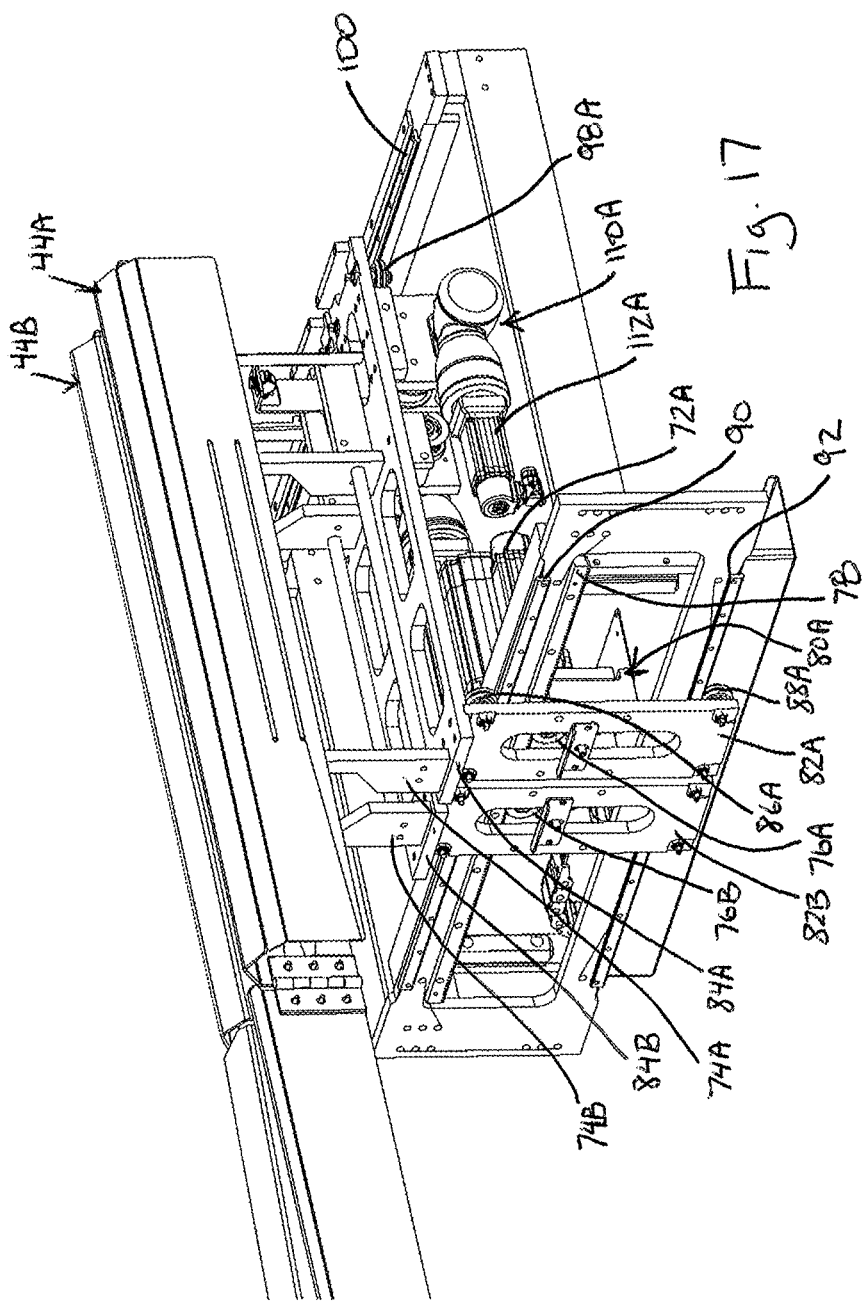

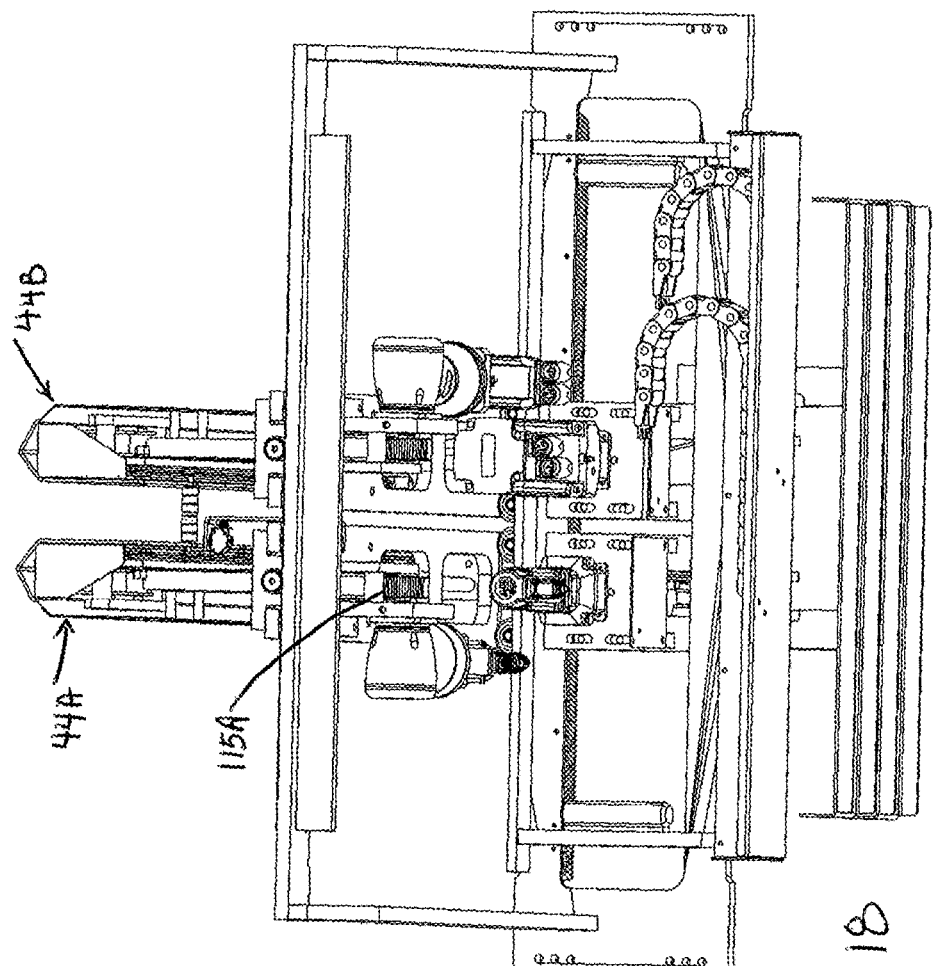

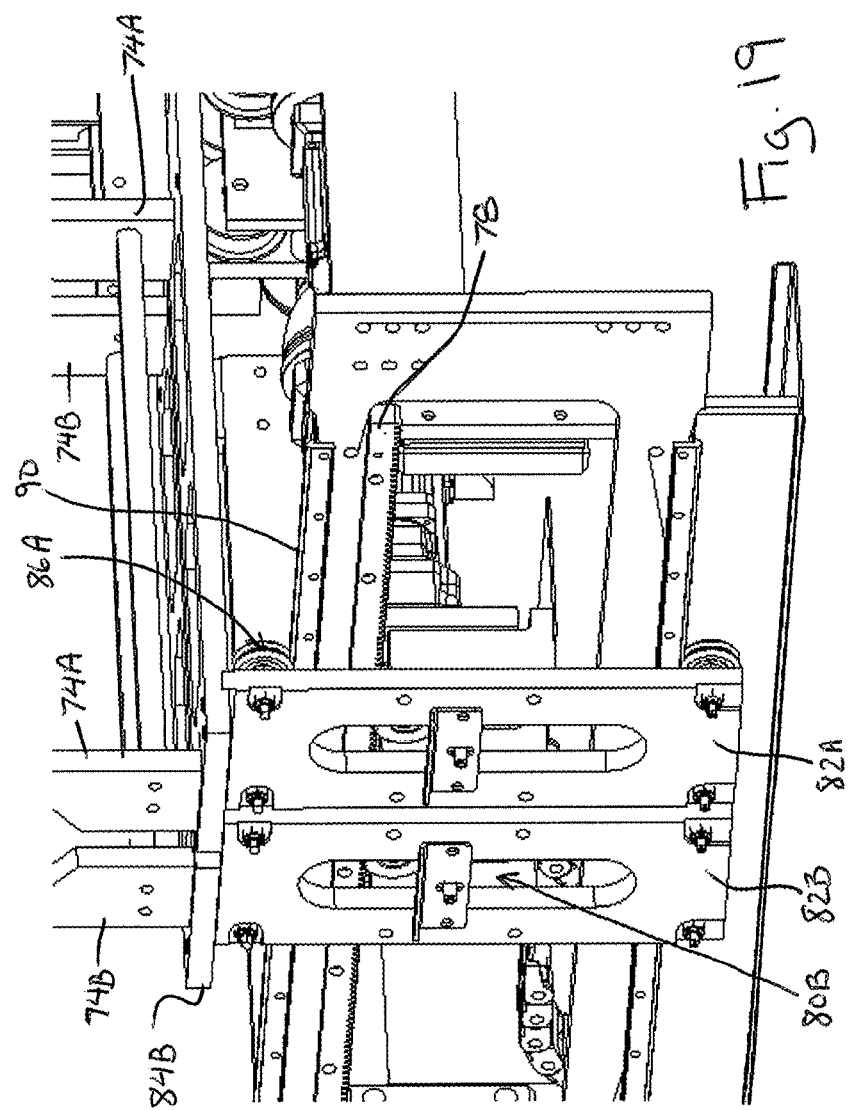

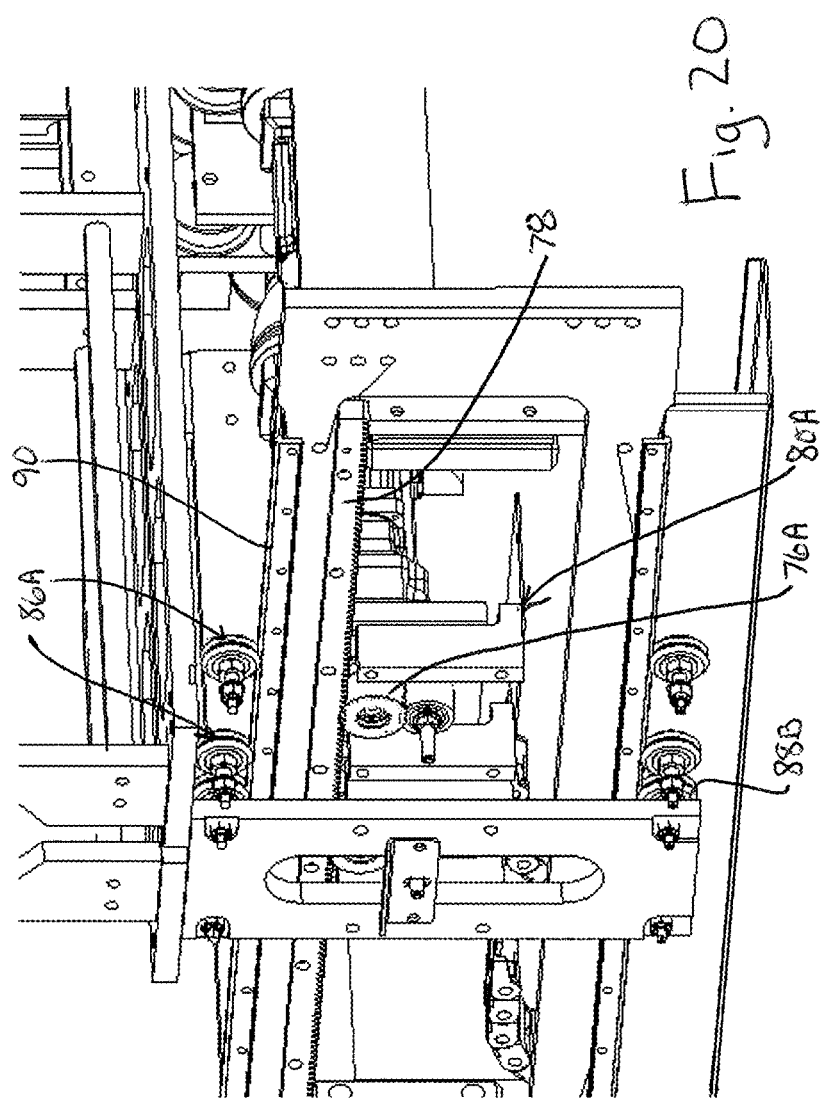

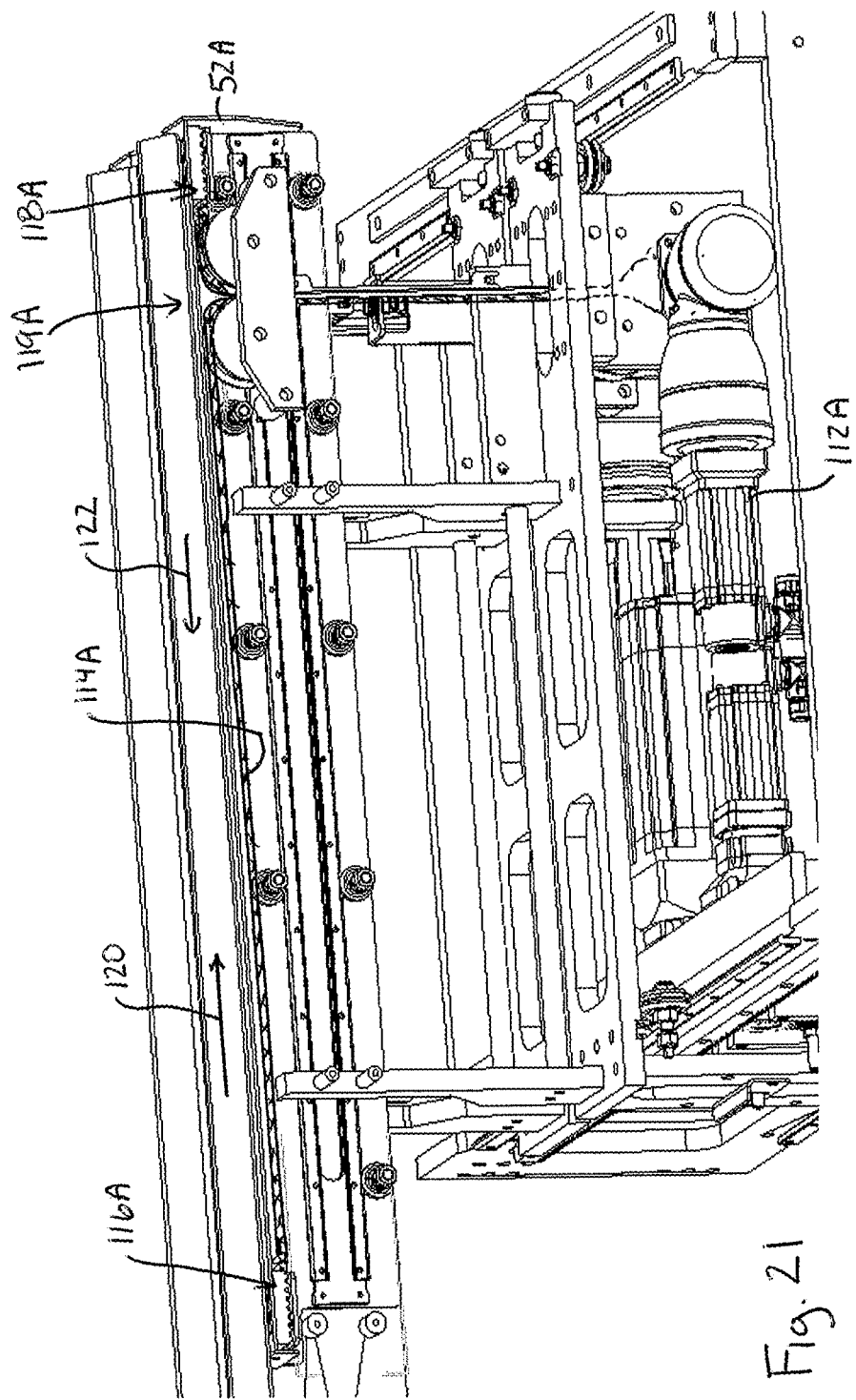

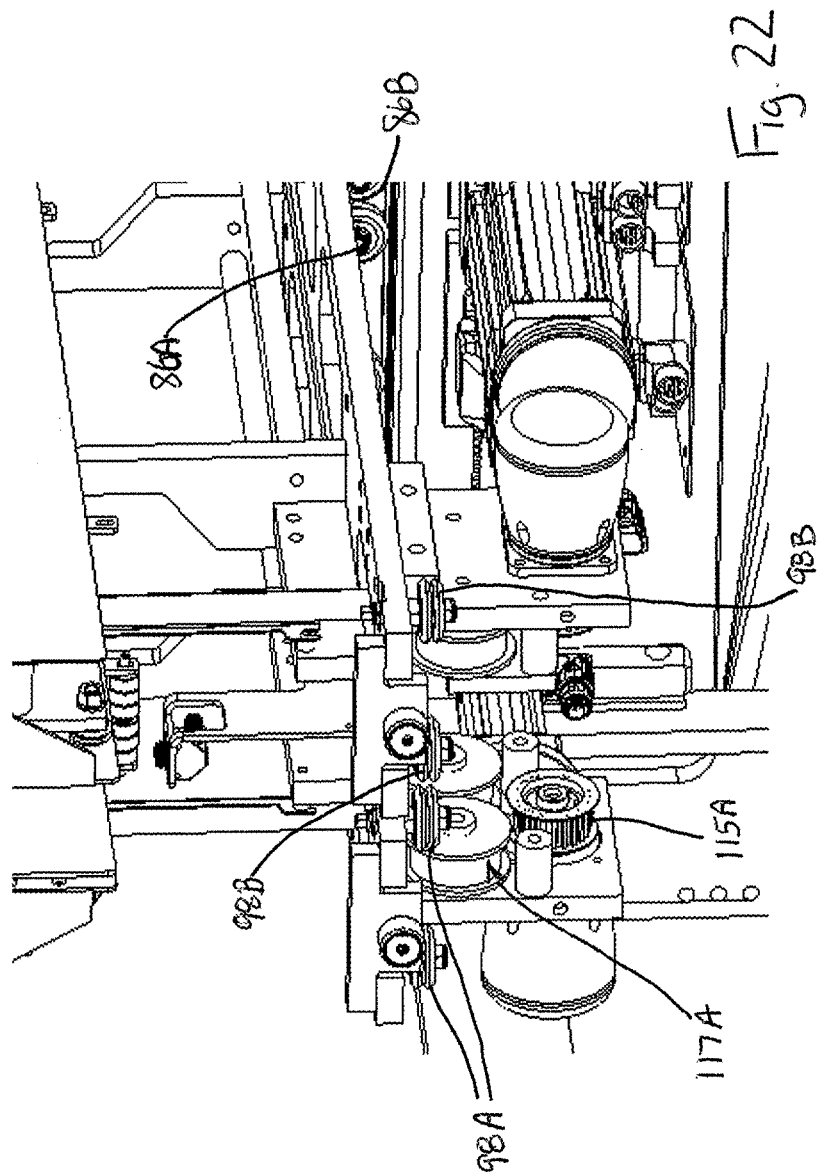

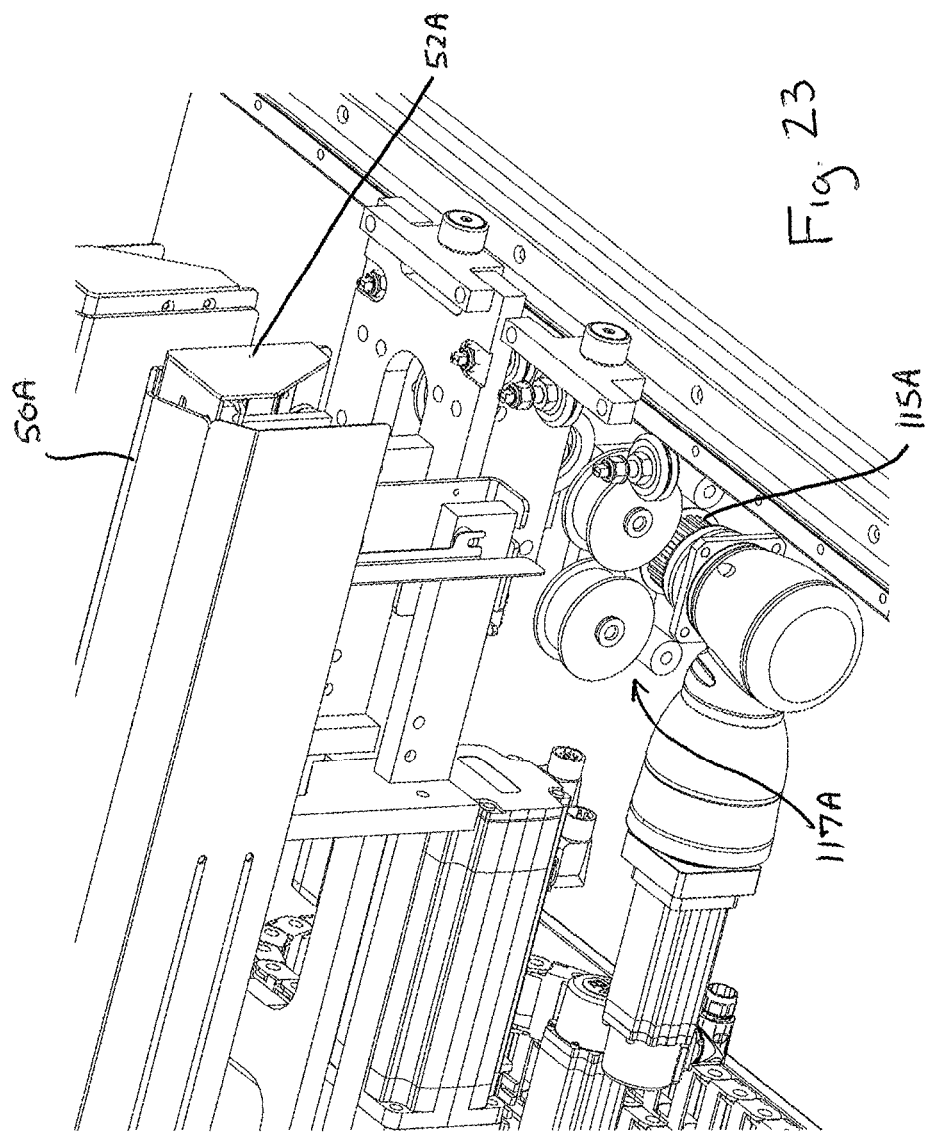

CONVEYING SYSTEM WITH HIGH SPEED LANE DIVIDER

TECHNICAL FIELD

This application relates generally to a conveying system and method for conveying products, materials or other items/objects traveling along a conveyor and, more specifically, to diversion of products from one conveying path into multiple conveying paths.

BACKGROUND

It is often necessary to sort objects being conveyed on a conveyor. The sorting may be necessitated by downstream events on demand or dynamically (such as too little or too much product at a subsequent station), by the need to separate objects based on their identity (which can be indicated by a bar code), for separation of objects based on their final destination, or for other reasons. Further, the objects may be conveyed in an irregular pattern, with irregular spacing or irregular product orientation. For any or all of these reasons, or for other reasons, it may be desirable to quickly divert objects traveling in one conveying path to another conveying path.

It would be desirable to provide a device to achieve high speed diversion without requiring an undesirably large footprint.

SUMMARY

In one aspect, a conveying system includes a conveyor and a diverter, the diverter including a shifting section above the conveyor. The shifting section is laterally movable across a width of the conveyor for selectively shifting objects across the width of the conveyor as the objects move along the conveyor. A drive system for effecting lateral movement of the shifting section is located beneath the conveyor.

In another aspect, a system for diverting objects traveling along an infeed conveyor includes a conveyor having an input end and an output end, the input end positioned to receive objects from the infeed conveyor. A diverter includes an infeed section and an outfeed section above the conveyor, the infeed section positioned for receiving objects traveling along the infeed conveyor and onto the input end of the conveyor, the outfeed section laterally movable across a width of the conveyor for selectively directing objects to one of a plurality of output paths. The outfeed section is formed by spaced apart walls that are formed as telescoping wall assemblies.

In another aspect, a system for diverting objects traveling along an infeed conveyor includes a conveyor having an input end and an output end, the input end positioned to receive objects from the infeed conveyor. A diverter includes an infeed section and an outfeed section above the conveyor, the infeed section positioned for receiving objects traveling along the infeed conveyor and onto the input end of the conveyor, the outfeed section laterally movable across a width of the conveyor for selectively directing objects to one of a plurality of output paths. The infeed section includes spaced apart first and second walls defining an inlet mouth, and spaced apart third and fourth walls defining a throat that feeds to the outfeed section. The outfeed section includes spaced apart fifth and six walls selectively movable along a lateral width of the conveyor. The first and second walls are stationary. An upstream end of the third wall is pivotally associated with a downstream end of the first wall for pivot about a first upstream pivot axis, wherein an upstream end of the fourth wall is pivotally associated with a downstream end of the second wall for pivot about a second upstream pivot axis. A downstream end of the third wall is pivotally associated with an upstream end of the fifth wall for pivot about a first downstream pivot axis, wherein a downstream end of the fourth wall is pivotally associated with an upstream end of the sixth wall for pivot about a second downstream pivot axis. Lateral movement of the fifth wall causes pivot of the third wall about both the first upstream pivot axis and the first downstream pivot axis, and lateral movement of the sixth wall causes pivot of the fourth wall about both the second upstream pivot axis and the second downstream pivot axis, such that the throat maintains alignment for feeding objects to the outfeed section.

BRIEF DESCRIPTION OF THE DRAWINGS

FIGS. 16 and 17 are an enlarged partial views of FIG. 15;

FIG. 18 is a bottom perspective view of the diverting system of FIG. 15;

FIG. 19 is an enlarged partial view of FIG. 17;

FIG. 20 is a view according to FIG. 19 with certain components removed;

FIG. 21 is a partial perspective view of the diverting system showing internal components of one of the telescoping walls; and FIGS. 22 and 23 are partial perspective views of portions of the diverting system showing components of the drive system for one of the telescoping walls.

DETAILED DESCRIPTION

Figure 1:
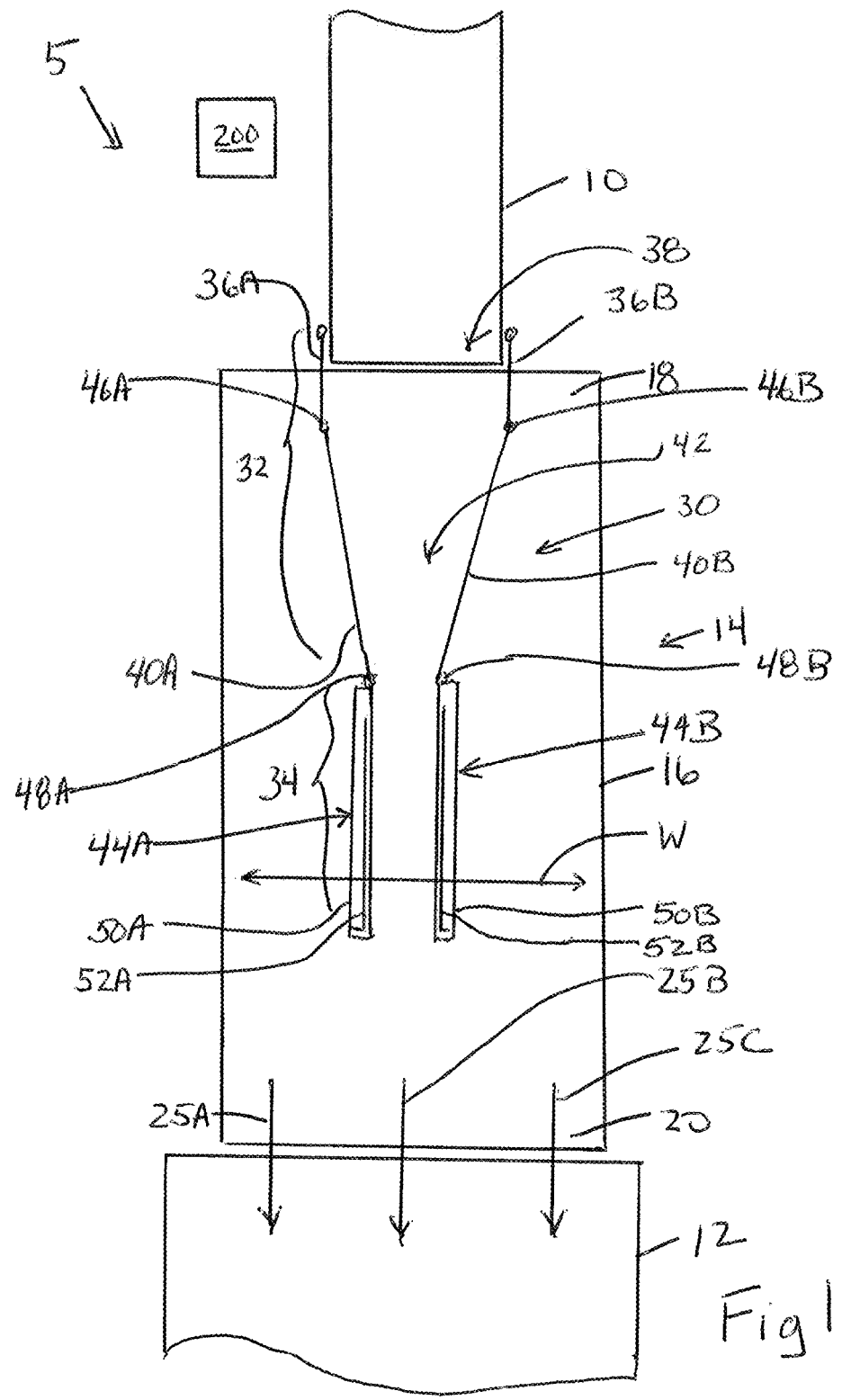
FIG. 1 is a top plan schematic view of a diverting system.

Referring to FIG. 1, top plan schematic view of a conveying system 5 with a diverting system is shown and includes an infeed conveyor 10, an outfeed conveyor 12 and a diverting system 14 that includes a conveyor 16 with an input end 18 and an output end 20, the input end 18 positioned to receive objects from the infeed conveyor 10. A diverter 30 includes an infeed section 32 and an outfeed section 34 above the conveyor 16. The infeed section 32 is positioned for receiving objects traveling along the infeed conveyor 10 and onto the input end 18 of the conveyor mechanism, and the outfeed section 34 is laterally movable across a width of the conveyor 16 for selectively directing objects to one of a plurality of output paths (e.g., 25A, 25B, 25C).

The infeed section 32 includes spaced apart walls 36A, 36B defining an inlet mouth 38. The infeed section also includes spaced apart walls 40A, 40B defining a throat 42 that feeds to the outfeed section 34. The outfeed section includes spaced apart walls 44A, 44B selectively movable along a lateral width W of the conveyor 16.

Here, the walls 36A, 36B are stationary. An upstream end of the wall 40A is pivotally associated with a downstream end of wall 36A for pivot about an upstream pivot axis 46A, and an upstream end of the wall 40B is pivotally associated with a downstream end of the wall 36B for pivot about an upstream pivot axis 46B. By way of example, a hinge may be used to connect wall 40A to wall 36A, and likewise for wall 40B and wall 46B. A downstream end of the wall 40A is pivotally associated with an upstream end of the wall 44A for pivot about a downstream pivot axis 48A, and a downstream end of the wall 40B is pivotally associated with an upstream end of the wall 44B for pivot about a downstream pivot axis 48B. With this arrangement, lateral movement of the wall 44A causes pivot of the wall 40A about both the upstream pivot axis 46A and the downstream pivot axis 48A, and lateral movement of the wall 44B causes pivot of the wall 40B about both the upstream pivot axis 46B and the downstream pivot axis 48B, such that the throat 42 maintains alignment for feeding objects to the outfeed section 34.

Figure 4:
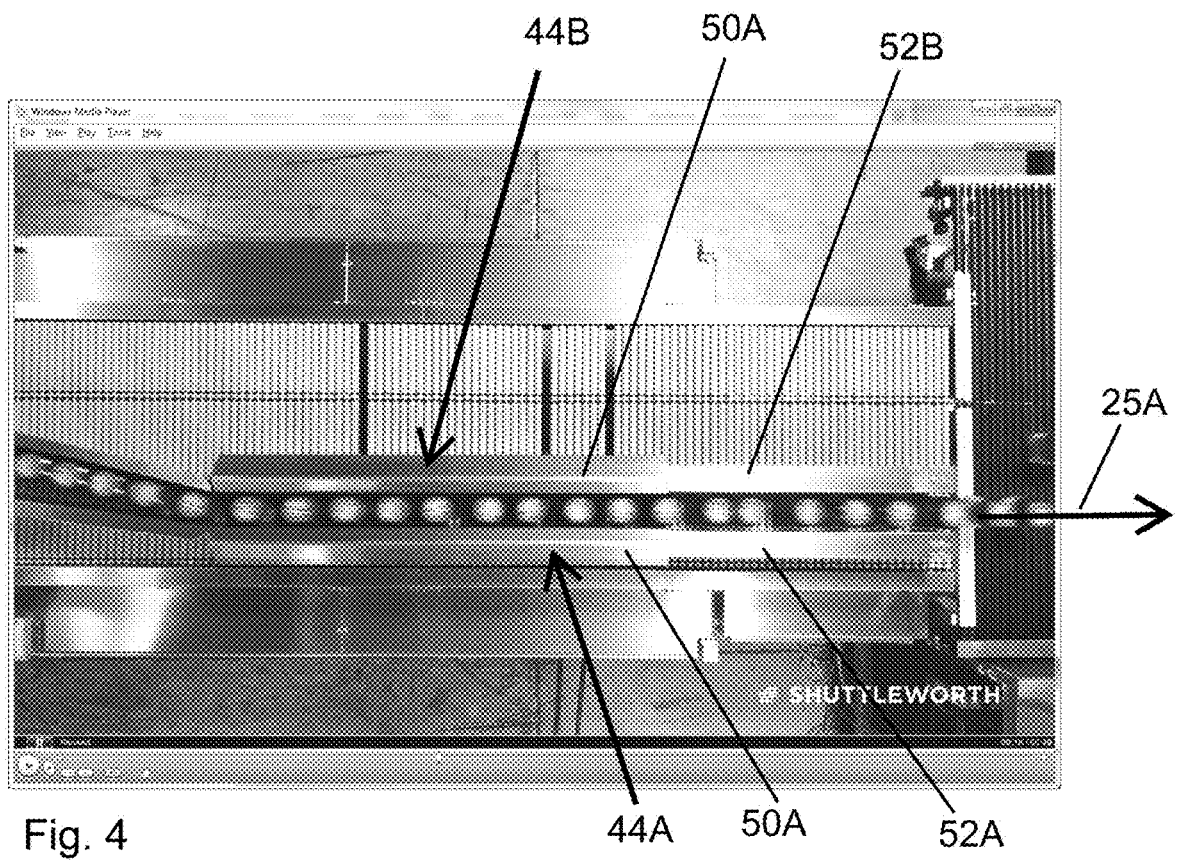

The wall 44A is configured as a telescoping wall assembly that includes a wall segment 50A and a wall segment 52A, wherein the wall segment 52A is movable from a collapsed position substantially alongside the wall segment 50A (per FIG. 1) to an extended position extending substantially beyond a downstream end of the wall segment 50A (e.g., per FIG. 4). The wall 44B is similarly configured as a telescoping wall assembly a wall segment 50B and a wall segment 52B. By way of example, wall segments 50A and 50B may be of an inverted U-shape or V-shape configuration, with wall segments 52A and 52B sliding into and out of the inverted U-shape/V-shape.

In one implementation, the various walls of the diverter are formed of stainless steel for cleanability, but other materials could be used.

Figure 2:
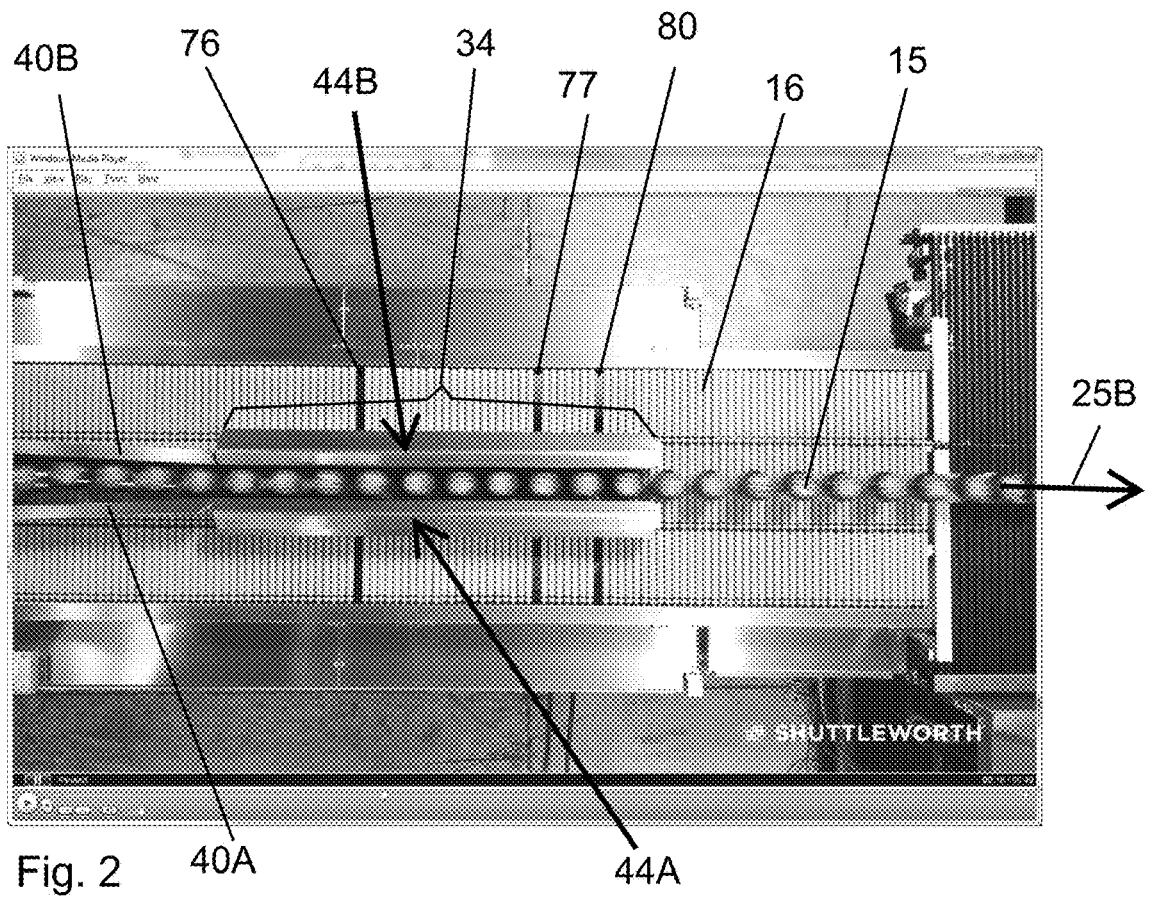
FIGS. 2-14 show views of the diverting system in operation to feed product to three different paths.
Figure 3:
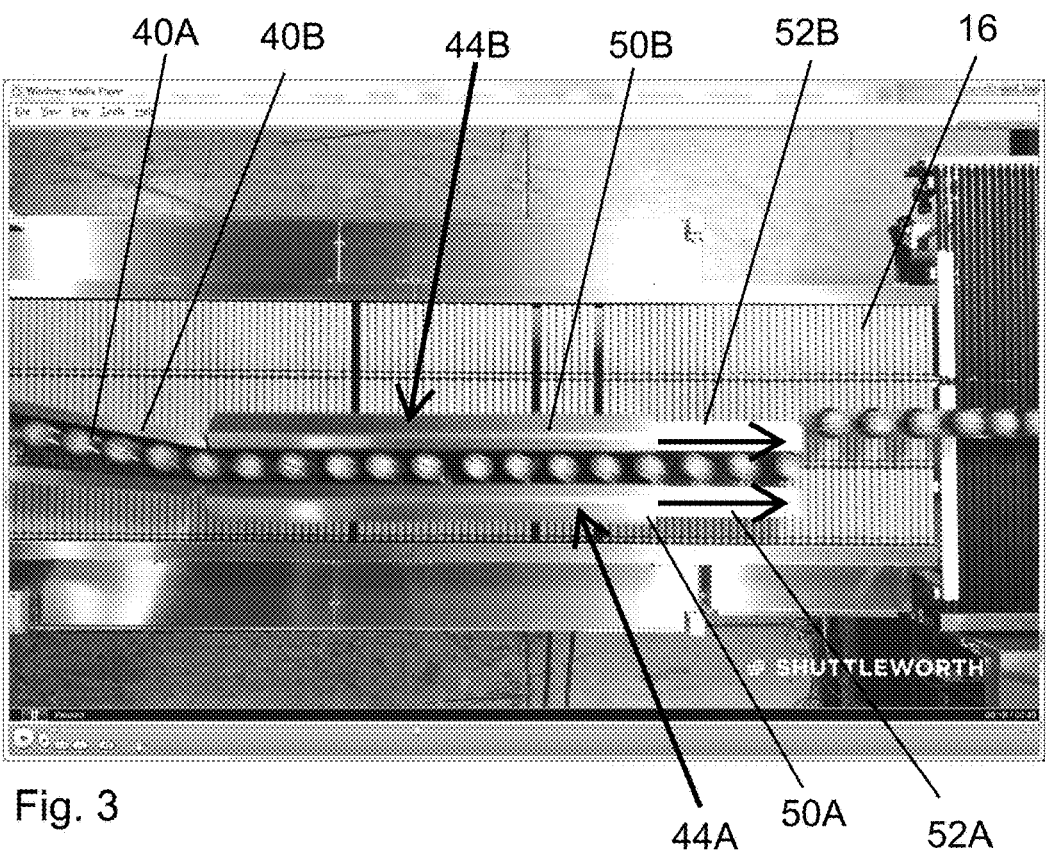
Figure 5:
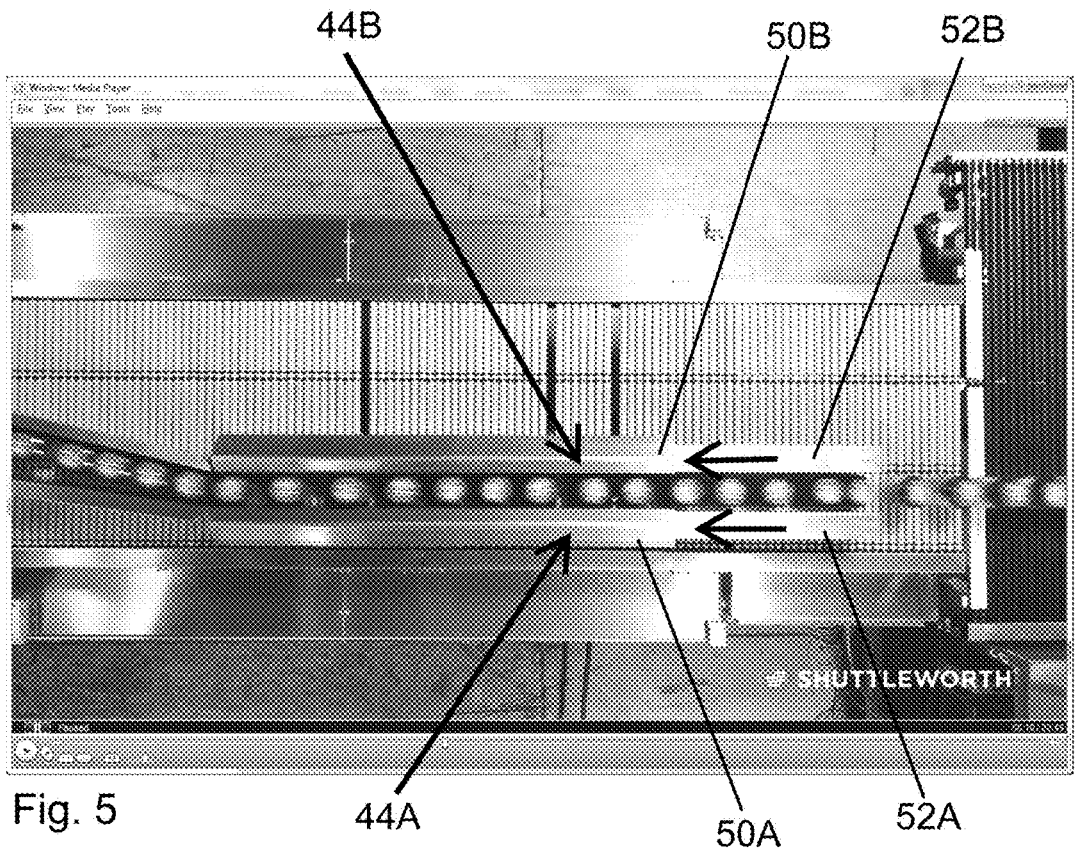
Figure 6:
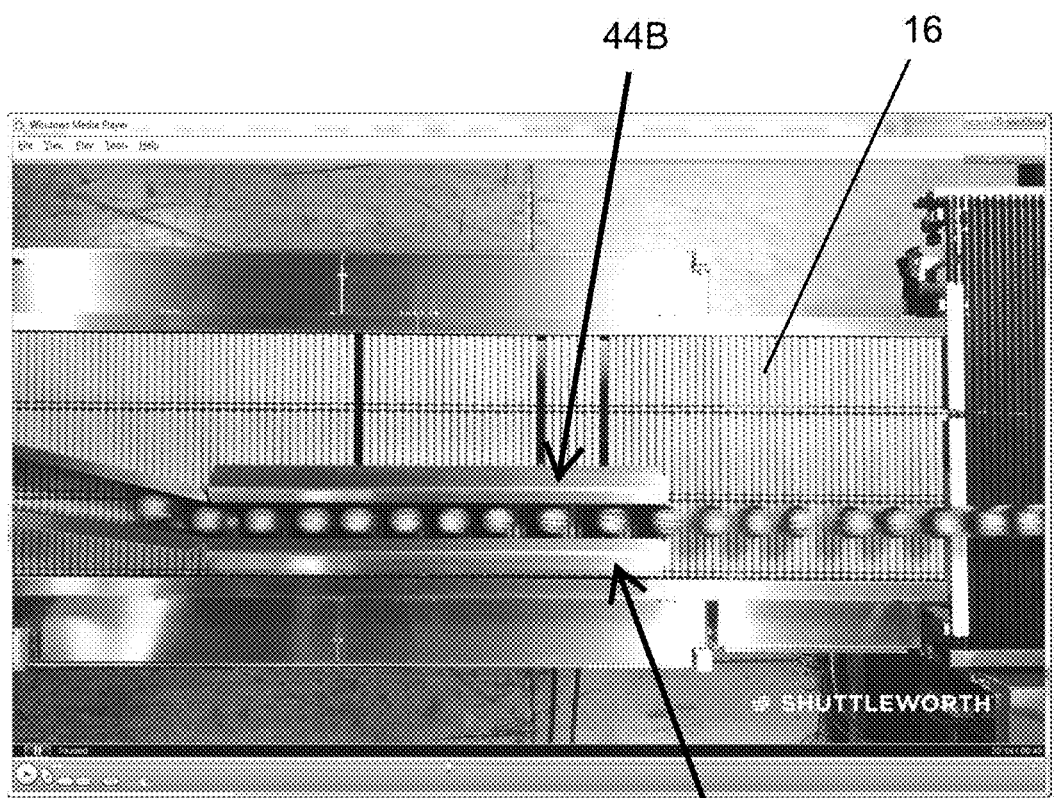
Figure 7:
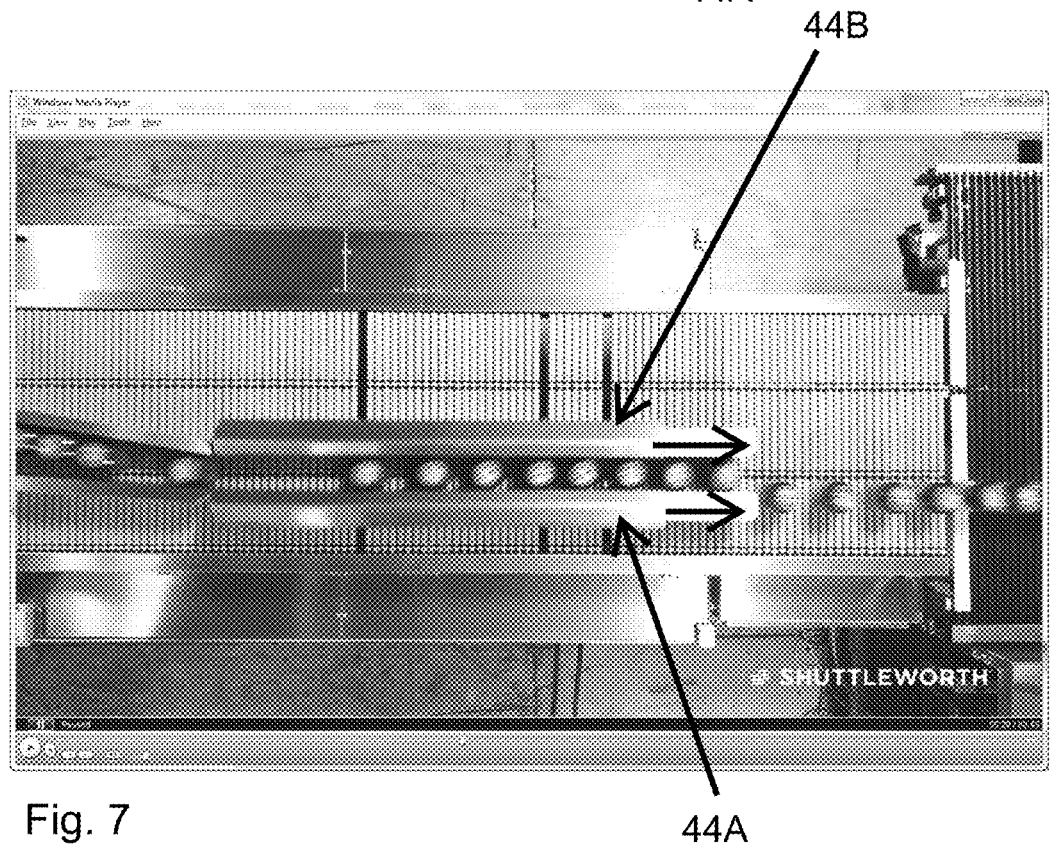
Figure 8:
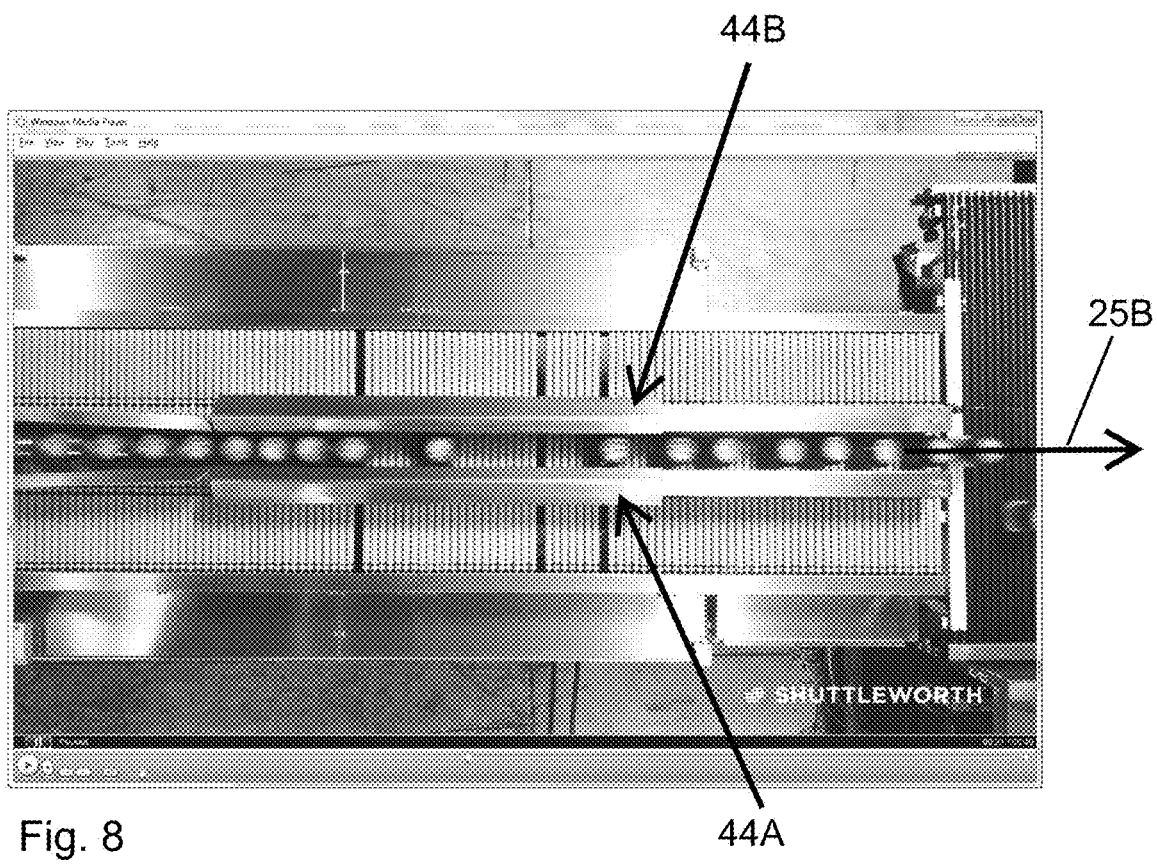
Figure 9:
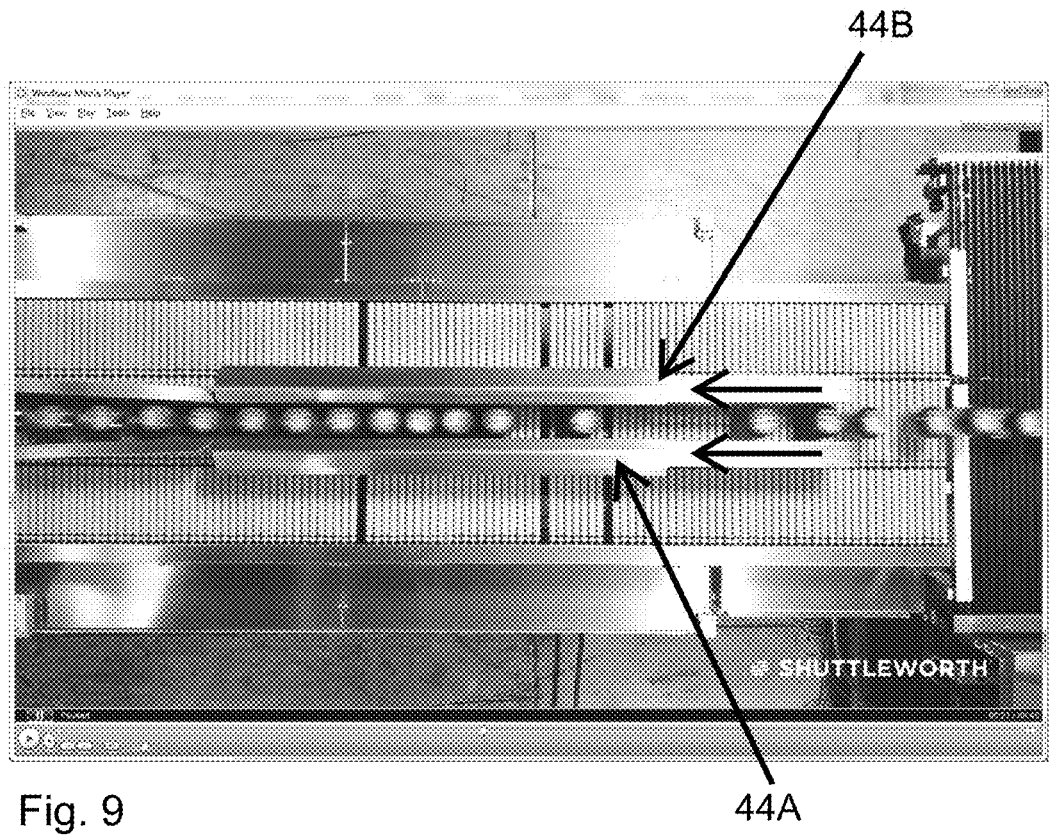
Figure 10:
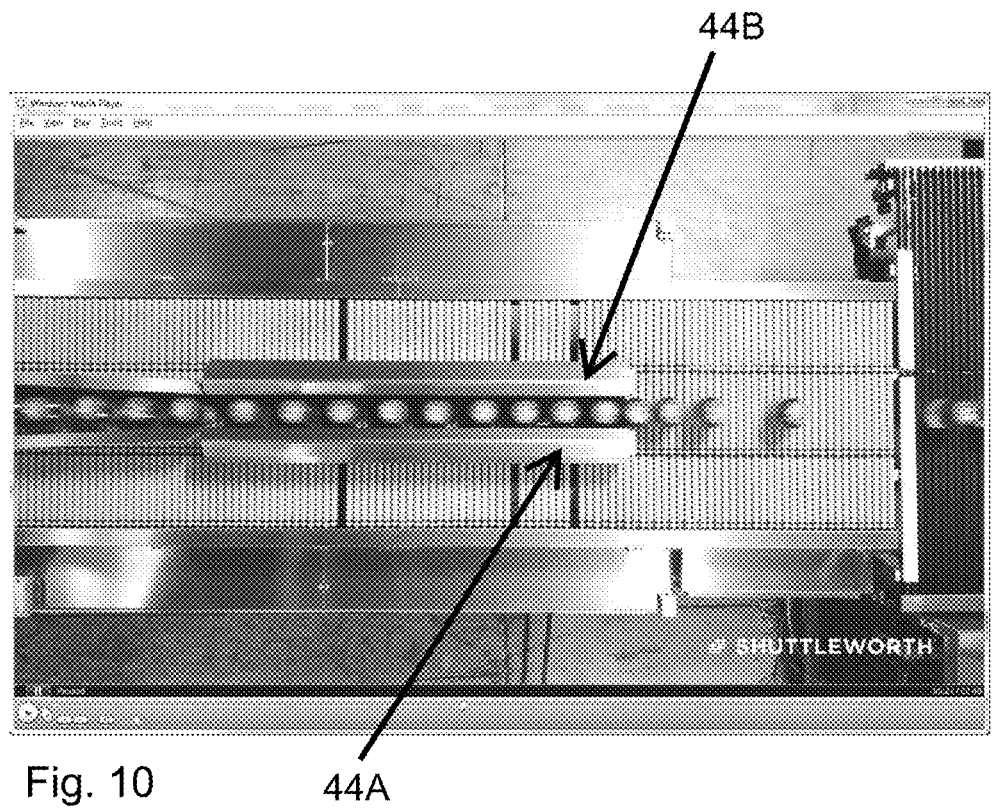
Figure 11:
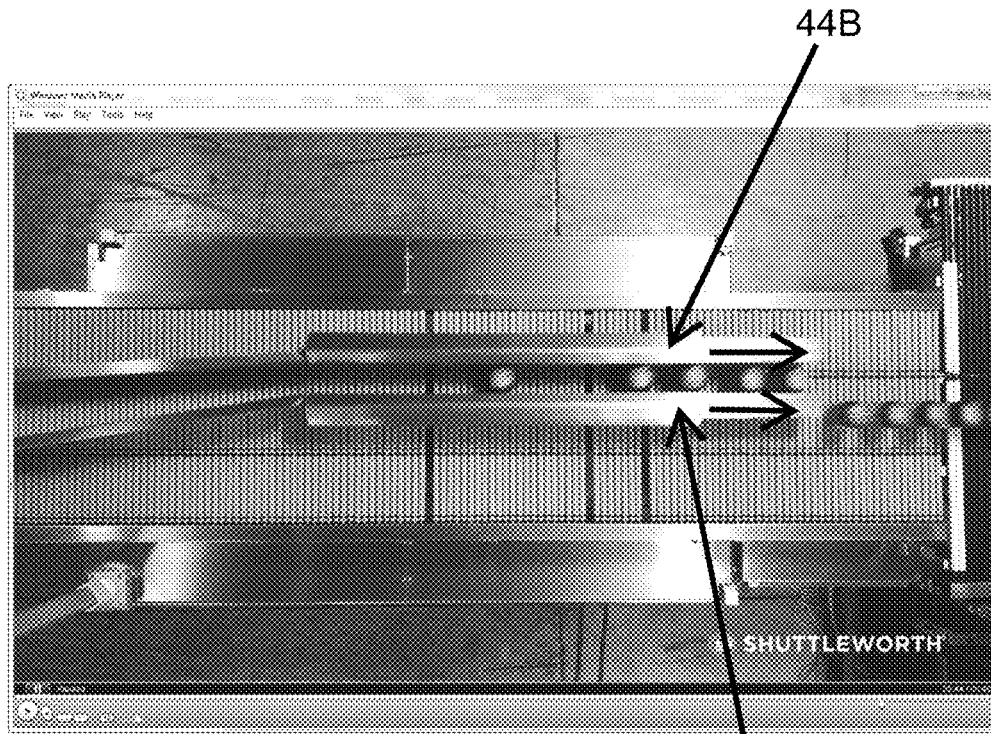
Figure 12:
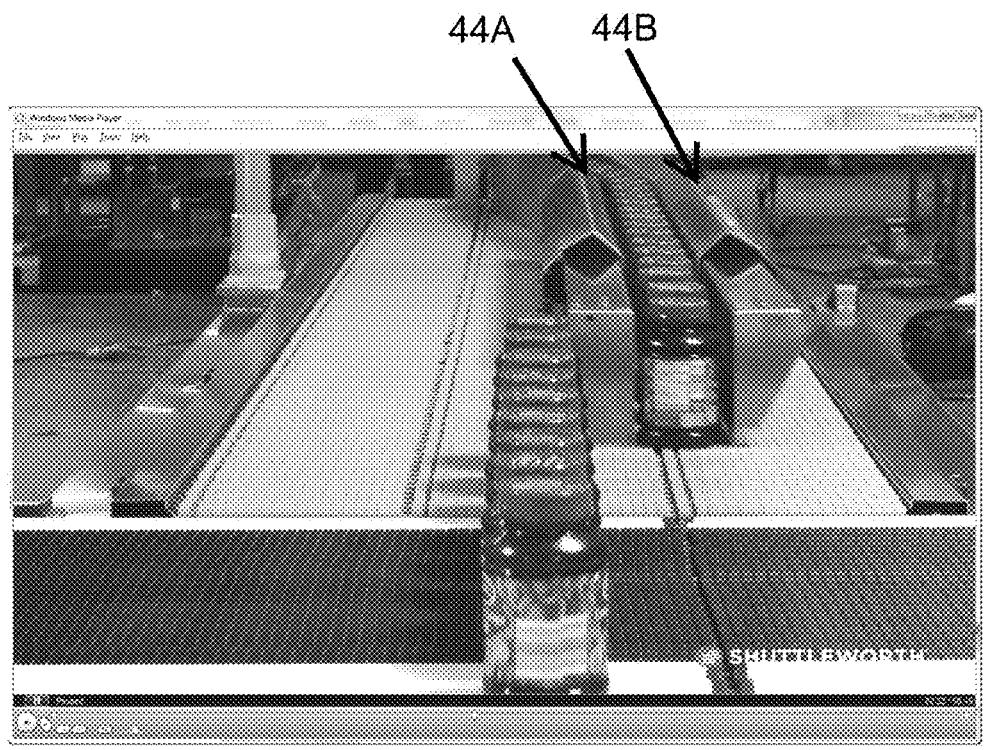
Figure 13:
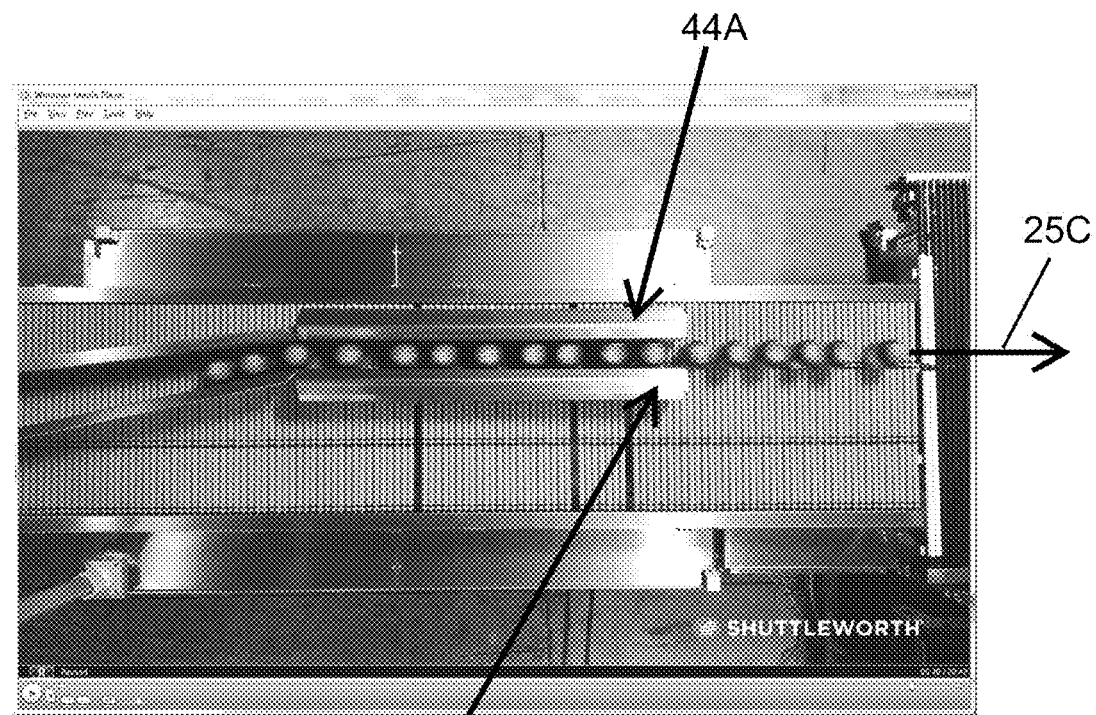
Figure 14:
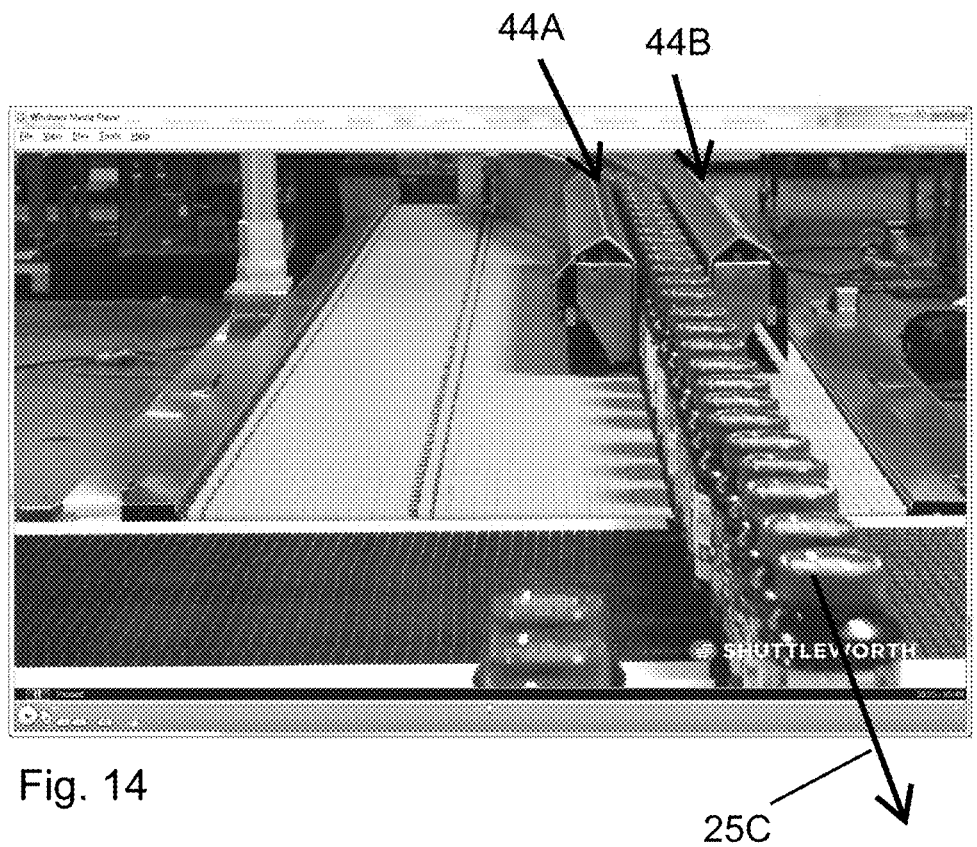
Figure 15:
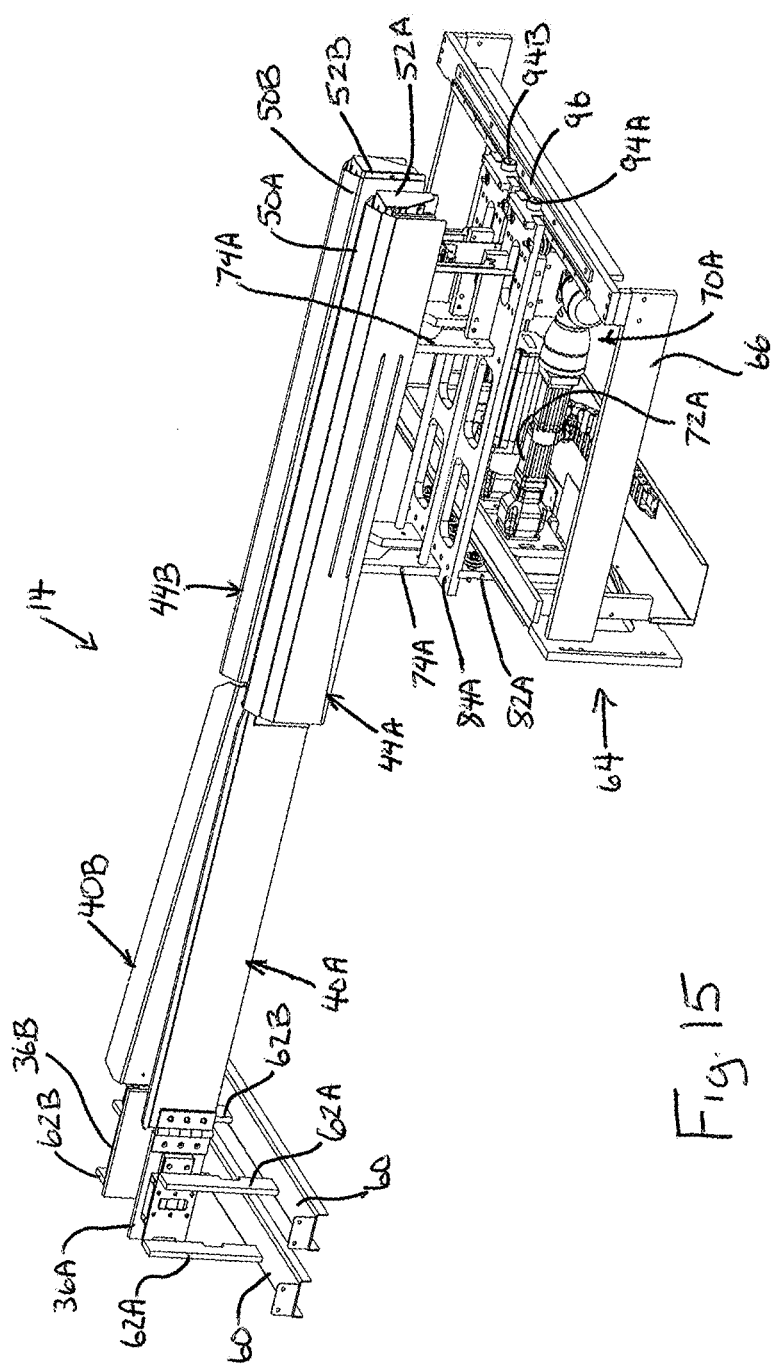
FIG. 15 is a perspective view of the diverting system, without the conveyor, showing the drive system(s) components that effect both lateral movement of the outfeed section and extension and collapse of the outfeed section.

Referring to FIGS. 2-14, a movement sequence of the diverter 14 to divert objects 15 from a single incoming path to multiple output paths is depicted. FIG. 2 shows objects being delivered by the diverter to a middle path 25B. Per FIG. 3, when the walls 44A and 44B begin to shift laterally, the walls 44A and 44AB also begin to extend so that the objects 15 moving through the outfeed section also shift laterally. For this reason, the speed of extension of the walls 44A and 44B should at least match the movement speed of the objects on the conveyor 16. Per FIGS. 4-6, once the lateral movement operation is completed to deliver the objects to the side path 25A, the walls 44A and 44B can then retract in order to prepare for a next lateral shift. FIGS. 7-8 show simultaneous lateral shifting and extension of walls 44A and 44B to again deliver objects to path 25B, and FIGS. 9-10 show retracting or collapse of the walls 44A, 44B in preparation for another lateral move. FIGS. 11-14 show simultaneous lateral shifting and extension of walls 44A and 44B, and subsequent retraction, to deliver objects to side path 25C.

As may be noted from FIGS. 2-14, the lateral shifting of the outfeed section 34 of the diverter is achieved without using any actuating structure that is above the path of the objects as they travel and/or without using any actuating structure that extends alongside the lateral sides of the conveyor 16 (thereby maintaining a small footprint). Moreover, lateral shifting of the outfeed section 34 is achieved by using drive mechanisms that are located primarily below the conveyor 16.

In this regard, reference is made to FIGS. 15-23, depicting the diverter 14, but without the conveyor shown, so that the components below the conveyor are visible. As seen, at the upstream end, a pair of brackets 60 below the conveyor are fixed and support the walls 36A and 36B via upright bars 62A and 62B. The upright bars extend up through a laterally running gap in the conveyor (not shown). A drive system 64 for moving the walls laterally and for extending and collapsing the walls is also shown and includes a stationary frame 66 that mounts below the conveyor (e.g., to part of the conveyor frame).

A drive mechanism 70A is linked to the wall 44A for laterally moving the wall 44A, and includes a prime mover 72A positioned beneath the conveyor and at least one support 74A extending upwardly through a laterally extending gap in the conveyor. For example, lateral gaps 76, 77 and 80 in the conveyor 16 are shown in FIG. 2, where the conveyor 16 is formed by an array of driven roller mechanisms and each gap is formed by the absence of a row or roller mechanisms in the array. In other embodiments, the conveyor 16 could be formed by sets of driven belts, where each lateral gap is formed by a spacing between the downstream end of one belt and the upstream end of a next belt forming the conveyor 16. Regardless of the configuration of the conveyor 16, the gaps advantageously enable the drive for the walls 44A and 44B to be located below the conveyor rather than above or alongside the conveyor.

In this regard, in relation to wall 44A and drive mechanism 70A, the supports 74A are operatively connected to the wall 44A such that lateral movement of the supports 74A (e.g., with upper portions of the supports 74A moving along the conveyor gaps 76 and 77 shown in FIG. 2) causes lateral movement of the wall 44A. Here, the prime mover 72A (e.g., motor, such as a servomotor) rotates a toothed output member in the form of a pinion gear 76A that engages with a gear rack 78, such that rotation of the pinion gear 76A causes movement of the prime mover 72A relative to the gear rack 78. The gear rack runs in a lateral direction below the conveyor, the prime mover 72A is rigidly connected to the support 74A. Here, the prime mover 72A is mounted to one or more brackets or end blocks 80A that in turn are fixed to an end plate 82A. The end plate 82A is fixed to a horizontal plate 84A, and the supports 74A are fixed to and extend up from the horizontal plate. The end plate 82A includes upper and lower wheels 86A, 88A that ride on rails 90, 92 during lateral movement, and the downstream end of the horizontal plate 84A includes an end wheel 94A that rides on a rail or surface 96 to provide vertical support for the plate 84A, and another wheel set 98A that engages laterally with a rail 100 to provide stabilization in the conveyance direction.

A drive mechanism 70B linked to the wall 44B is of similar configuration to mechanism 70A, and includes a prime mover 72B, supports 74B, a pinion gear 76B, brackets/end blocks 80B, end plate 82B, horizontal plate 84B, upper and lower wheels 86B, 88B, end wheel 94B, wheel set 98B. Notably, the prime movers 72A and 72B can be operated simultaneously and in synchronization during diverter operation in accordance with the above description of FIGS. 2-14. However, the prime movers 72A and 72B can also be operated independently in order to adjust a size/width of the lateral spacing between the two walls 44A and 44B, as may be necessary to effectively handle objects of different sizes.

Drives are also provided to enable extension and collapse of the telescoping walls 44A and 44B. In this regard, wherein a drive mechanism 110A is linked to move the wall segment 52A relative to the wall segment 50A, and includes a prime mover 112A (e.g. motor, such as a servomotor) positioned below the conveyor. The prime mover 112A may be linked to move a first cable, chain or belt 114A that extends about a rotating timing sprocket 115A operatively connected to the prime mover output shaft and then upward through the gap 80 (FIG. 2) in the conveyor, guided by lower idler wheel set 117A and upper idler wheel set 119A, and operatively connects to the wall segment 52A. Here, the cable, chain or belt 114A includes opposite ends 116A, 118A, both of which are operatively connected to the wall segment 52A toward opposite ends of the wall segment 52A. Movement of the cable, chain or belt in one direction 120 causes extension of the wall segment 52A from wall segment 50A, and movement of the cable, chain or belt 114A in an opposite direction 122 causes retraction or collapse of the wall segment 52A into wall segment 50A. A similar drive mechanism is provided for extending and collapsing the wall 44B.

The general operation of the diverting system may be carried out as needed using a controller (shown schematically as 200 in FIG. 1) and associated sensors for detecting and/or counting objects. Exemplary sensor types include photo-electric sensors, metallic proximity sensors, weight sensors (load cells), barcode readers, RFID readers or others. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control and/or processing functions of the system or the control and/or processing functions of any component thereof.

Notably, the controller 200 is operatively connected for controlling the prime movers 72A, 72B, and the controller may be configured with a first operation mode in which the prime movers 72A, 72B are operated so as to maintain a consistent spacing between the walls 44A and 44B during lateral movement of the outfeed section 34 (consistent with what is seen in FIGS. 2-14). The controller may also be configured with a second operation mode in which the prime movers 72A, 72B are operated to adjust the spacing between the walls 44A and 44B to adjust the outfeed section 34 for handling different object widths. In the first operation mode, the prime movers 72A and 72B may be operated to always move the walls 44A and 44B in the same direction. In the second operation mode, the prime movers 72A and 72B may be operated to move the walls 44A and 44B in opposite directions. The controller is also operatively connected to control operation of the prime movers that extend and retract wall segments 52A and 52B of the walls 44A and 44B.

It is to be clearly understood that the above description is intended by way of illustration and example only, is not intended to be taken by way of limitation, and that other changes and modifications are possible. For example, in some embodiments the stationary walls (e.g., 36A, 36B) of the infeed section could be eliminated. Moreover, in other implementations the underconveyor drive system could be used to laterally shift walls above the conveyor for other purposes. Likewise, the telescoping walls in combination with an underconveyor drive system to control the telescoping could be used in other applications.

What is claimed is:

1. A system for diverting objects traveling along an infeed conveyor, comprising:
    a conveyor having an input end and an output end, the input end positioned to receive objects from an infeed conveyor, wherein the conveyor defines a conveyance direction;
    a diverter including an infeed section and an outfeed section above the conveyor, the infeed section positioned for receiving objects traveling along the infeed conveyor and onto the input end of the conveyor, the outfeed section laterally movable across a width of the conveyor for selectively directing objects to one of a plurality of output paths;
    wherein the infeed section includes spaced apart first and second walls defining an inlet mouth;
    wherein the infeed section includes spaced apart third and fourth walls defining a throat that feeds to the outfeed section, wherein a spacing between the third and fourth walls narrows when moving in the conveyance direction such that the throat narrows when moving in the conveyance direction;
    wherein the outfeed section includes spaced apart fifth and six walls selectively movable along the width of the conveyor;
    wherein the first and second walls are stationary;
    wherein an upstream end of the third wall is pivotally associated with a downstream end of the first wall for pivot about a first upstream pivot axis, wherein an upstream end of the fourth wall is pivotally associated with a downstream end of the second wall for pivot about a second upstream pivot axis;
    wherein a downstream end of the third wall is pivotally associated with an upstream end of the fifth wall for pivot about a first downstream pivot axis, wherein a downstream end of the fourth wall is pivotally associated with an upstream end of the sixth wall for pivot about a second downstream pivot axis;
    wherein lateral movement of the fifth wall causes pivot of the third wall about both the first upstream pivot axis and the first downstream pivot axis, and lateral movement of the sixth wall causes pivot of the fourth wall about both the second upstream pivot axis and the second downstream pivot axis, such that the throat maintains alignment for feeding objects to the outfeed section;
    wherein a first drive mechanism is linked to the fifth wall for laterally moving the fifth wall, wherein the first drive mechanism includes a first prime mover positioned beneath the conveyor and at least one first support extending upwardly through the conveyor and operatively connected to the fifth wall such that lateral movement of the first support causes lateral movement of the fifth wall;
    wherein a second drive mechanism is linked to the sixth wall for laterally moving the sixth wall, wherein the second drive mechanism includes a second prime mover positioned beneath the conveyor and at least one second support extending upwardly through the conveyor and operatively connected to the sixth wall such that lateral movement of the second support causes lateral movement of the sixth wall.

2. The system of claim 1:
    wherein the fifth wall comprises a first telescoping wall assembly including a first wall segment and a second wall segment, wherein the second wall segment is movable from a collapsed position substantially alongside the first wall segment and an extended position extending substantially beyond a downstream end of the first wall segment;
    wherein the sixth wall comprises a second telescoping wall assembly including a third wall segment and a fourth wall segment, wherein the fourth wall segment is movable from a collapsed position substantially alongside the third wall segment and an extended position extending substantially beyond a downstream end of the third wall segment.

3. The system of claim 2:
wherein a third drive mechanism is linked to move the second wall segment relative to the first wall segment, the third drive mechanism including a third prime mover positioned below the conveyor, the third prime mover linked to move a first cable, chain or belt that extends upward through the conveyor and operatively connects to the second wall segment;
wherein a fourth drive mechanism is linked to move the fourth wall segment relative to the third wall segment, the fourth drive mechanism including a fourth prime mover positioned below the conveyor, the fourth prime mover linked to move a second cable, chain or belt that extends upward through the conveyor and operatively connects to the fourth wall segment.

4. The system of claim 3, further comprising:
a controller connected for controlling the first and second prime movers, wherein the controller is configured with a first operation mode in which the first and second prime movers are operated so as to maintain a consistent spacing between the fifth and sixth walls during lateral movement of the outfeed section, and wherein the controller is configured with a second operation mode in which the first and second prime movers are operated to adjust the spacing between the fifth and sixth walls to adjust the outfeed section for handling different object widths.

5. The system of claim 4, wherein the controller is configured to control telescoping movement of the fifth and sixth walls during lateral movement of the fifth and sixth walls.

6. A system for diverting objects traveling along an infeed conveyor, comprising:
a conveyor having an input end and an output end, the input end positioned to receive objects from the infeed conveyor;
a diverter including an infeed section and an outfeed section above the conveyor, the infeed section positioned for receiving objects traveling along the infeed conveyor and onto the input end of the conveyor, the outfeed section laterally movable across a width of the conveyor for selectively directing objects to one of a plurality of output paths;
wherein the outfeed section is formed by spaced apart first and second walls, each of which comprises as telescoping wall assembly;
a drive system for effecting telescoping movement of each of the first and second walls, wherein the drive system includes first and second prime movers, wherein the first prime mover is operatively connected to drive a first cable, chain or belt that extends upward through a gap in the conveyor, wherein the first cable, chain or belt is linked to the first wall to effect telescoping movement of the first wall, wherein the second prime mover is operatively connected to drive a second cable, chain or belt that extends upward through the gap in the conveyor, wherein the second cable, chain or belt is linked to the second wall to effect telescoping movement of the second wall.

7. The system of claim 6, further comprising:
a drive system for effecting lateral movement of the outfeed section, the drive system including at least one prime mover located beneath the conveyor and at least one support extending upwardly through a second gap in the conveyor and engaged with a part of the outfeed section.

8. The system of claim 7, wherein the at least one prime mover includes a third prime mover and a fourth prime mover positioned beneath the conveyor, wherein the at least one support includes a first support and a second support, the first support extending upwardly through the second gap in the conveyor and operatively connected to the first wall such that lateral movement of the first support causes lateral movement of the first wall, and the second support extending upwardly through the second gap in the conveyor and operatively connected to the second wall such that lateral movement of the second support causes lateral movement of the second wall.

9. The system of claim 8, further comprising:
a controller connected for controlling the third and fourth prime movers, wherein the controller is configured with a first operation mode in which the third and fourth prime movers are operated so as to maintain a consistent spacing between the first and second walls during lateral movement of the outfeed section, and wherein the controller is configured with a second operation mode in which the third and fourth prime movers are operated to adjust the spacing between the first and second walls to adjust the outfeed section for handling different object widths.

10. The system of claim 9, wherein, in the first operation mode, the third and fourth prime movers are operated to always move the first and second walls in the same direction, and wherein, in the second operation mode, the third and fourth prime movers are operated to move the first and second walls in opposite directions.

11. A system for diverting objects traveling along an infeed conveyor, comprising:
a conveyor having an input end and an output end, the input end positioned to receive objects from an infeed conveyor;
a diverter including an infeed section and an outfeed section above the conveyor, the infeed section positioned for receiving objects traveling along the infeed conveyor and onto the input end of the conveyor, the outfeed section laterally movable across a width of the conveyor for selectively directing objects to one of a plurality of output paths;
wherein a drive system for effecting lateral movement of the outfeed section includes at least one prime mover located beneath the conveyor and a support connected to the outfeed section and extending upward through a gap in the conveyor.

12. The system of claim 11, wherein:
the outfeed section includes spaced apart first and second walls, wherein the at least one prime mover includes a first prime mover linked to move the first wall and a second prime mover linked to move the second wall;
a controller is operatively connected to operate the first prime mover and the second prime mover, the controller configured with an adjustment mode in which the first prime mover and the second prime mover are operated to adjust a spacing between the first and second walls for accommodating objects of different sizes.

13. The system of claim 12, wherein the controller is configured with an operating mode in which the first prime mover and the second prime mover are operated to maintain the spacing between the first and second walls during lateral movement of the outfeed section.

14. The system of claim 11, wherein the prime mover rotates a gear that engages with a gear rack, such that rotation of the gear causes movement of both the prime mover and the support relative to the gear rack.

15. A conveying system, comprising:
a conveyor defining a conveyance direction;
a diverter including a shifting section above the conveyor, the shifting section laterally movable across a width of the conveyor for selectively shifting objects across the width of the conveyor as the objects move along the conveyor; and
a first drive system for effecting lateral movement of the shifting section, the first drive system including at least one prime mover located beneath the conveyor;
wherein the shifting section includes spaced apart first and second walls, wherein each of the first and second walls is formed as an extendable wall assembly that can extend in the conveyance direction and retract in a direction opposite the conveyance direction;
a second drive system for effecting extension and retraction of the first and second walls, the second drive system including at least one prime mover located beneath the conveyor and connected to at least one of the first and second walls through a laterally extending first gap in the conveyor.

16. The system of claim 15, wherein the at least one prime mover of the first drive system is operatively linked to the shifting section by a component that extends upward through a laterally extending second gap in the conveyor.

17. The system of claim 16, wherein the at least one prime mover of the first drive system includes a first prime mover and a second prime mover, wherein the first prime mover is operatively linked to move the first wall and the second prime mover is operatively linked to move the second wall.

18. The system of claim 17, wherein the first prime mover and the second prime mover can be operated independently to adjust a gap size between the first wall and the second wall for accommodating objects of different sizes.

* * * * *